United States Patent
Cardona et al.

(10) Patent No.: US 8,423,636 B2
(45) Date of Patent: Apr. 16, 2013

(54) DYNAMIC SETTING OF MBUF MAXIMUM LIMITS

(75) Inventors: Omar Cardona, Austin, TX (US); James B. Cunningham, Austin, TX (US); Baltazar De Leon, III, Austin, TX (US); Matthew Ochs, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/766,274

(22) Filed: Apr. 23, 2010

(65) Prior Publication Data

US 2011/0264789 A1 Oct. 27, 2011

(51) Int. Cl.
*G06F 15/173* (2006.01)
(52) U.S. Cl.
USPC .......................................... 709/224; 370/412
(58) Field of Classification Search .................. 709/224; 370/412
See application file for complete search history.

(56) References Cited

U.S. PATENT DOCUMENTS

| | | | |
|---|---|---|---|
| 6,636,901 | B2 | 10/2003 | Sudhakaran et al. |
| 6,829,662 | B2 | 12/2004 | King-Smith et al. |
| 7,124,266 | B1 | 10/2006 | Harmer et al. |
| 7,269,136 | B2 | 9/2007 | Peacock |
| 7,552,303 | B2 | 6/2009 | Dunshea et al. |
| 2004/0205304 | A1 | 10/2004 | McKenney et al. |
| 2005/0105469 | A1* | 5/2005 | Hao .............................. 370/235 |
| 2006/0253694 | A1 | 11/2006 | Porterfield |
| 2007/0133582 | A1* | 6/2007 | Banerjee et al. .............. 370/412 |
| 2009/0234989 | A1* | 9/2009 | Fischer ........................... 710/56 |
| 2009/0249371 | A1 | 10/2009 | Cardona et al. |

OTHER PUBLICATIONS

RTA000024192; How to Tune AIX Kernel MBU Setting; Apr. 27, 1992, TechLib, pp. 1-6.*
Kim, Paul M; Office Action; U.S. Appl. No. 12/057,852, filed Jun. 24, 2011; USPTO.
Cardona, Omar; Response to Office Action; App. No. 12/05852; Septemeber 24, 2011; USPTO.
Cardona, Omar; Buffer Allocation for Network Subsystem; U.S. Appl. No. 12/057,852, filed Mar. 28, 2008; USPTO.
Kim, Paul M; Final Office Action; U.S. Appl. No. 12/057,852, filed Dec. 13, 2011; USPTO.
Yar, Tikhiy; FreeBSD mbuf man page; Oct. 17, 2000; nixdoc.net, p. 3.
Linked List; Microsoft Computer Dictionary; Mar. 15, 2002; Microsoft Press, 5th Edition; p. 396.

* cited by examiner

*Primary Examiner* — John Follansbee
*Assistant Examiner* — Glenford Madamba
(74) *Attorney, Agent, or Firm* — David Mims; Robert C. Rolnik (57) ABSTRACT

A data processing system stack initializes a first mbuf chain limit to a pre-set level. It receives at least one packet. The system receives at least one packet. The system returns an mbuf data structure in response to receiving at least one packet from an IP address. The system measures a health of the network connection to determine whether the network connection satisfies a first health criterion. The system reduces the mbuf chain limit to a second mbuf chain limit, responsive to the health of the network connection not satisfying the first health criterion. The system measures the health of the network connection to determine whether the network connection meets a second health criterion.

20 Claims, 4 Drawing Sheets

DYNAMIC SETTING OF MBUF MAXIMUM LIMITS

BACKGROUND OF THE INVENTION

1. Field of the Invention

The present invention relates generally to a computer implemented method, data processing system, and computer program product for data communications. More specifically, the present invention relates to establishing a balance between the latency and efficiently processing data in a data processing system in one or more buffers.

2. Description of the Related Art

Computer systems frequently rely on network data connections to interoperate with other computers. Networked computers have been used in many architectures and business models. Data rates of common network elements are continuously being enhanced and redefined to meet new standards for speed and reliability. To satisfy higher data rate requirements, some computer architectures rely upon a network subsystem.

A network subsystem handles sessions, and more specifically, the packets that comprise the session. A packet is a series of bits that include at least a destination address and other header information as well as one or more bits in a payload. The packet may be located in various stages of transit. A packet can be in memory in preparation to transmit. A packet can be placed on a network medium. Alternatively, packet can be staged in memory within a receiving data processing system. A session is a flow of packets between two end-points on a network with attendant flow-control communications between the end-points. A network connection is the combination of one or more packets from one or more sessions. In other words, the network connection can be the undifferentiated stream of packets that are received or transmitted from a network interface card. These packets include those that are connectionless, unreliable, and unacknowledged. Accordingly, the network connection is the aggregate of all packets that touch the network interface during the duration that the network interface is active and/or available. The network connection may be made sub-divided into the network connection of received packets.

A network subsystem uses memory management facilities to provide readily available physical memory to buffer incoming and outgoing data streams. A unit of memory provided for this purpose is called an mbuf. An mbuf or memory buffer is used to store data in the kernel for incoming and outbound network traffic. Such memory always resides in physical memory and is never paged out.

A network service periodically needs to transport data. At this time, the network service can call an operating system mbuf allocator. An operating system mbuf allocator is a service that locks a pool of memory set aside for mbufs during a memory allocation operation. A buffer pool is one of one or more portions of memory set aside for networking operations. A call is an instruction and/or the act of a processor performing the instruction such that another block of code contains the next computer readable instruction. The operating system (OS) mbuf allocator then obtains at least one mbuf, and unlocks the pool. An example of an OS mbuf allocator is the m_get( ) function of the AIX® operating system. AIX is a registered trademark of IBM Corporation.

The m_get( ) operating system mbuf allocator obtains an mbuf from a previously created mbuf linked list. An mbuf linked list is a linked list of nodes. Each node is a combination of a buffer and a link or a link alone. The mbuf linked list contains a set of mbufs that are within a pool that is lockable by the OS mbuf allocator. The OS mbuf allocator locks the pool regardless of whether the service request is for one mbuf or for all mbufs in an mbuf linked list. In addition, obtaining the mbuf involves as much as seventy machine level instructions. A lock is one or more bits that are associated with a tract of physical memory or other shared resource. The lock exists as either locked or unlocked, depending on the content of the one or more bits.

SUMMARY OF THE INVENTION

The present invention provides a computer implemented method, data processing system, and computer program product for setting mbuf chain limits in a device driver. The data processing system initializes a first mbuf chain limit to a pre-set level. The receive stack receives at least one packet. The receive stack returns an mbuf data structure in response to receiving at least one packet. The receive stack measures a health of the network connection to determine whether the network connection satisfies a first health criterion. The receive stack reduces the mbuf chain limit to a second mbuf chain limit, responsive to the health of the network connection not satisfying the first health criterion. The receive stack measures the health of the network connection to determine whether the network connection meets a second health criterion. The receive stack increases the mbuf chain limit to a second mbuf chain limit, wherein the second mbuf chain limit is higher than the first chain limit, responsive to the network connection satisfying the second health criterion.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
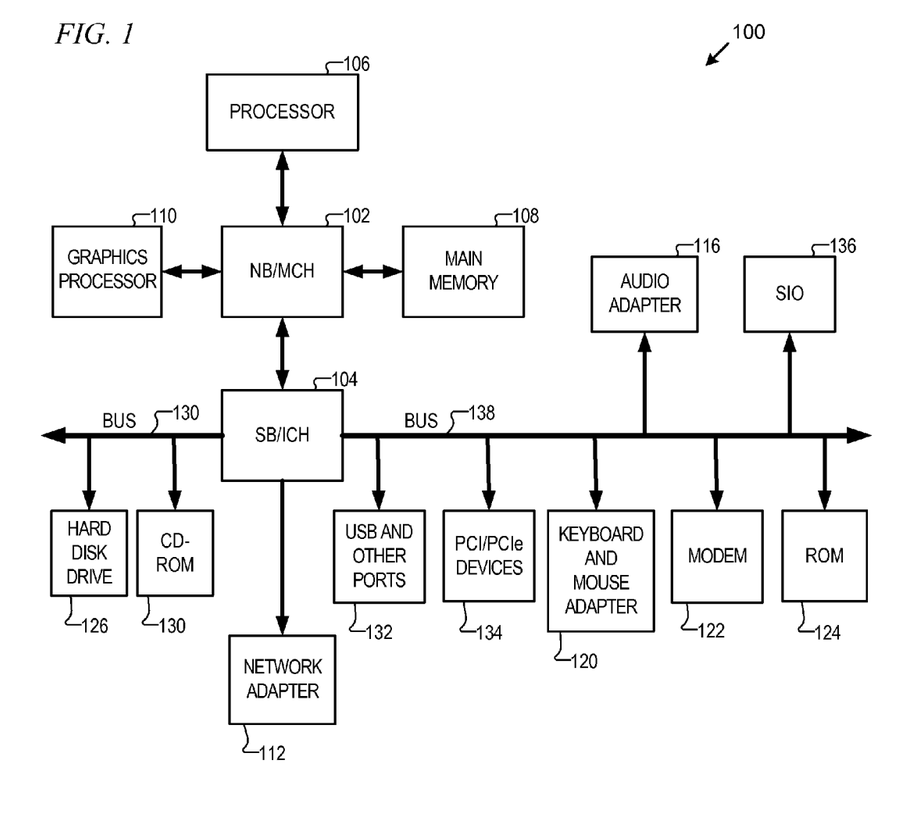
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
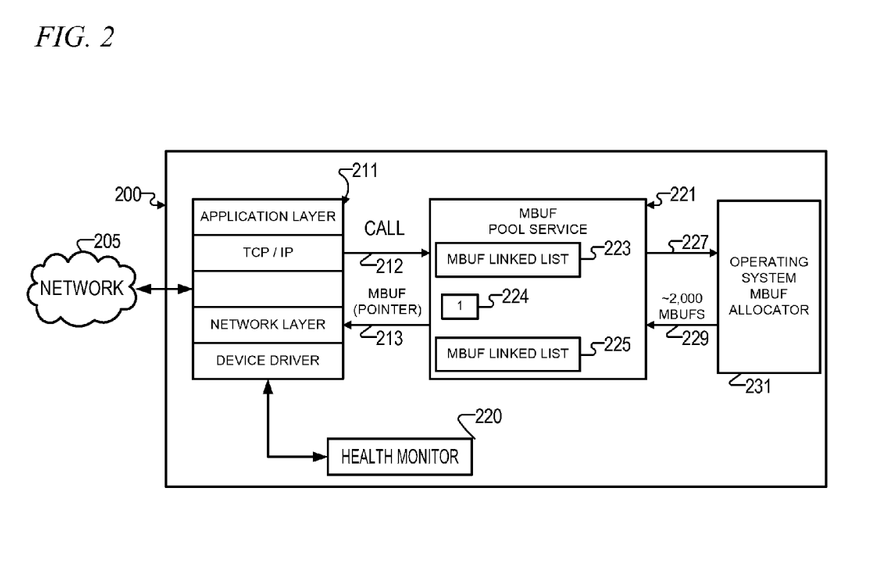
FIG. 2 is a diagram of software components that communicate in accordance with an illustrative embodiment of the invention.

FIG. 2 shows a diagram of software components 200 that communicate in accordance with an illustrative embodiment of the invention. An mbuf data structure is a structure that can be traversed in order. An mbuf data structure may be, for example, a linked list, an array or table, and the like. An mbuf data structure, such as an mbuf linked list, is further described below at FIG. 3. Protocol stack 211 may be a combination of kernel space and user-space software components that interact with network 205 to accomplish a communication function. The protocol stack may perform the function of receiving packets and making pools of packet data available to applications. Accordingly, the protocol stack is a form of receive stack. Protocol stack 211 communicates via call 212 with mbuf pool service 221 to obtain an mbuf as a pointer 213 to each mbuf requested. Mbuf pool service 221, in turn, can make calls to operating system (OS) mbuf allocator 231 to obtain mbuf linked lists, as needed. Health monitor 220 may periodically modify the sizing of the mbuf linked lists by changing variables that mbuf pool service references to allocate list size. A health monitor is a software component that may be dispatched to a processor to support monitoring and adjustments to the network connections. OS mbuf allocator 231 can be, for example, a modified m_get( ) function. The modified m_get( ) function is modified to determine a number of mbufs requested, and in response thereto, provide, to the extent available, the number of mbufs requested. The OS mbuf allocator iteratively references the pointer of one node to the content of a subsequent node to create the mbuf linked list, or other mbuf data structure.

Mbuf pool service 221 can obtain one mbuf linked list at a time from OS mbuf allocator 231. For example, mbuf pool service 221 can obtain mbuf linked list 223 and mbuf linked list 225 derived from a common pool or buffer pool of linked lists. Each of these linked lists may be allocated to transmit functions or receive functions, respectively, of protocol stack 211. The pool of linked lists may have an associated lock, for example, lock 224. A call from mbuf pool service 221 to OS mbuf allocator 231 may begin with mbuf pool service 221 making a request to obtain mbufs via request call 227. Unlike the m_get( ) function of the prior art, OS mbuf allocator 231, may respond to such a request by providing link 229 to mbuf linked list having multiple mbufs. OS mbuf allocator 231 may toggle lock 224 to accordingly protect mbufs while OS mbuf allocator 231 creates the mbuf linked list.

Figure 3:
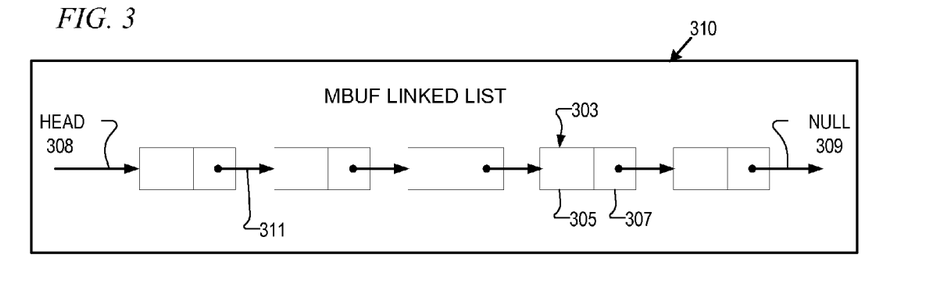
FIG. 3 is an mbuf linked list in accordance with an illustrative embodiment of the invention.

FIG. 3 is an mbuf linked list in accordance with an illustrative embodiment of the invention. Mbuf linked list 310 comprises at least one node pointed to by head 308. The mbuf linked list can consist of a range of mbufs corresponding to an mbuf cap that may vary between a range of values, for example 0 and 2048. As shown, the mbuf linked list has an mbuf chain limit of five. A head is a pointer to a first node in a set of at least one node of an mbuf linked list. A next packet may be pointed to by pointer 311. A variable that stores pointer 311 may be named "m_nextpkt." A node, such as node 303 can include memory buffer or mbuf 305 and a link 307. A link from one mbuf to a second mbuf may be referenced with the nomenclature: mbuf→m_nextpkt. In computer instructions that reference such a link, or next packet, the 'mbuf' is a name or other reference of the one mbuf, while 'mbuf→m_nextpkt' refers to the second mbuf. Accordingly, within a context of an mbuf, the m_nextpkt is the pointer to a next packet in the linked list. In addition, a node can be null 309. The null node can be the node that head 308 points to when mbuf linked list 310 becomes empty.

A receive buffer descriptor is a descriptor that defines a ring buffer in memory for received packets or the data contained within received packets. The receive buffer descriptor can include receive buffer length, receive frame length and receive buffer address, among other data.

The illustrative embodiments permit a device driver or kernel extension to respond to any Ethernet traffic that varies in rate by orders of magnitude. The embodiments may dynamically respond to health criteria of a network connection generally to grow mbuf chain limits so that a buffer or other data structure can accumulate packet data between interrupts without undue faults occurring in the network connection caused, for example, by packet retransmits of properly received packets. The network connection may be made sub-divided into the network connection of received packets. Accordingly, more packets may be processed in the kernel with each interrupt, than a former level of the mbuf chain limit. Conversely, where data rates drop, and buffers used by the driver are routinely partially filled, the embodiments may reduce the mbuf chain limit.

Figure 4A:
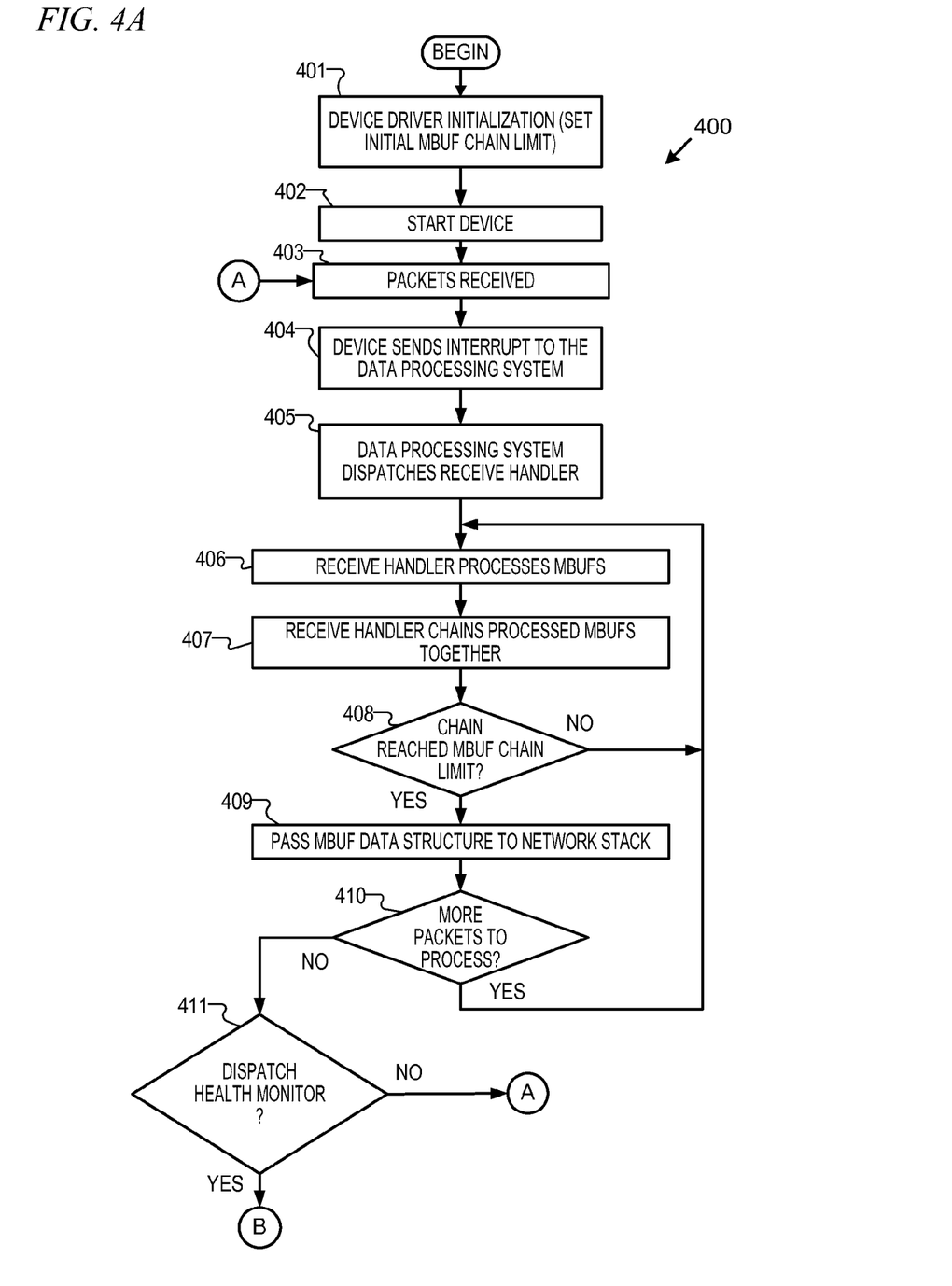
FIG. 4A is a flowchart of activity performed by a receive stack in accordance with an illustrative embodiment of the invention.

FIG. 4A is a flowchart of activity performed by a data processing system in accordance with an illustrative embodiment of the invention. Initially, in flowchart 400, a device driver is initialized (step 401). As part of the initialization, the data processing system may initialize a first initial mbuf chain limit to a pre-set level. For example, the pre-set level can be 128. A pre-set level is a level that may be selected by a system administrator. The pre-set level can be a best guess as to what a mbuf chain limit can be set to in order to provide a balance between efficient transfer of data via the mbuf data structure and an avoidance of excessive retransmits of packets or other forms of latency. Accordingly, by setting the mbuf chain limit to 128, the mbuf data structure is limited to up to 128 memory buffer or mbufs. The mbuf chain limit can vary in accordance with a health monitor, described below with reference to FIG. 4B. In addition, initialization can include setting of environment variables that set an absolute upper limit to a mbuf chain limit as well as a lower limit to the mbuf chain limit. Accordingly, the mbuf chain limit may be dynamically modified between the lower limit, and the maximum upper limit, inclusive, as explained further in FIG. 4B.

Next, the data processing system may start the device (step 402). Subsequently, one or more packets may be received (step 403). The packets can be from one or more internet protocol addresses, although the packets need not specify their source. The packets can be User Datagram Protocol (UDP) packets, Transport Control Protocol (TCP) packets, or any other form of Ethernet packet. Next, the device may send an interrupt to the data processing system (step 404).

In response, the data processing system may dispatch a receive handler (step 405). A receive handler is a process that is assigned resources of the data processing system. The receive handler may process mbufs (step 406). Next, the receive handler may chain the processed mbufs together (step 407).

Next, the receive handler may determine whether the mbuf data structure or mbuf chain has reached an mbuf chain limit (step 408). In other words, the receive handler may determine whether the mbuf data structure is full. A negative result may cause the receive handler to repeat step 406. However, a positive result, may cause the receive handler to pass the mbuf data structure to the network stack (step 409). The network stack can be, for example, receive stack 211 of FIG. 2.

Next, the receive handler may determine whether there are more packets to process (step 410). A positive determination results in step 406 being repeated. However a negative determination at step 410 may cause the receive handler to determine whether to dispatch a health monitor (step 411). If the health monitor is not to be dispatched, processing resumes at step 403. One illustrative embodiment of the invention may make the determination at step 411 to dispatch the health monitor upon a preset number of traversals through step 411. The preset number of traversals may be determined by setting and resetting a traversal counter at steps 401 and/or 421 of FIG. 4A or 4B, described further below with respect to the health monitor operations. The preset number of traversals can be one, in which case, the positive branch of step 411 is always taken. In contrast, if the preset number of traversals is two, then the positive branch of step 411 occurs every other time the data processing system executes the operation of step 411.

Figure 4B:
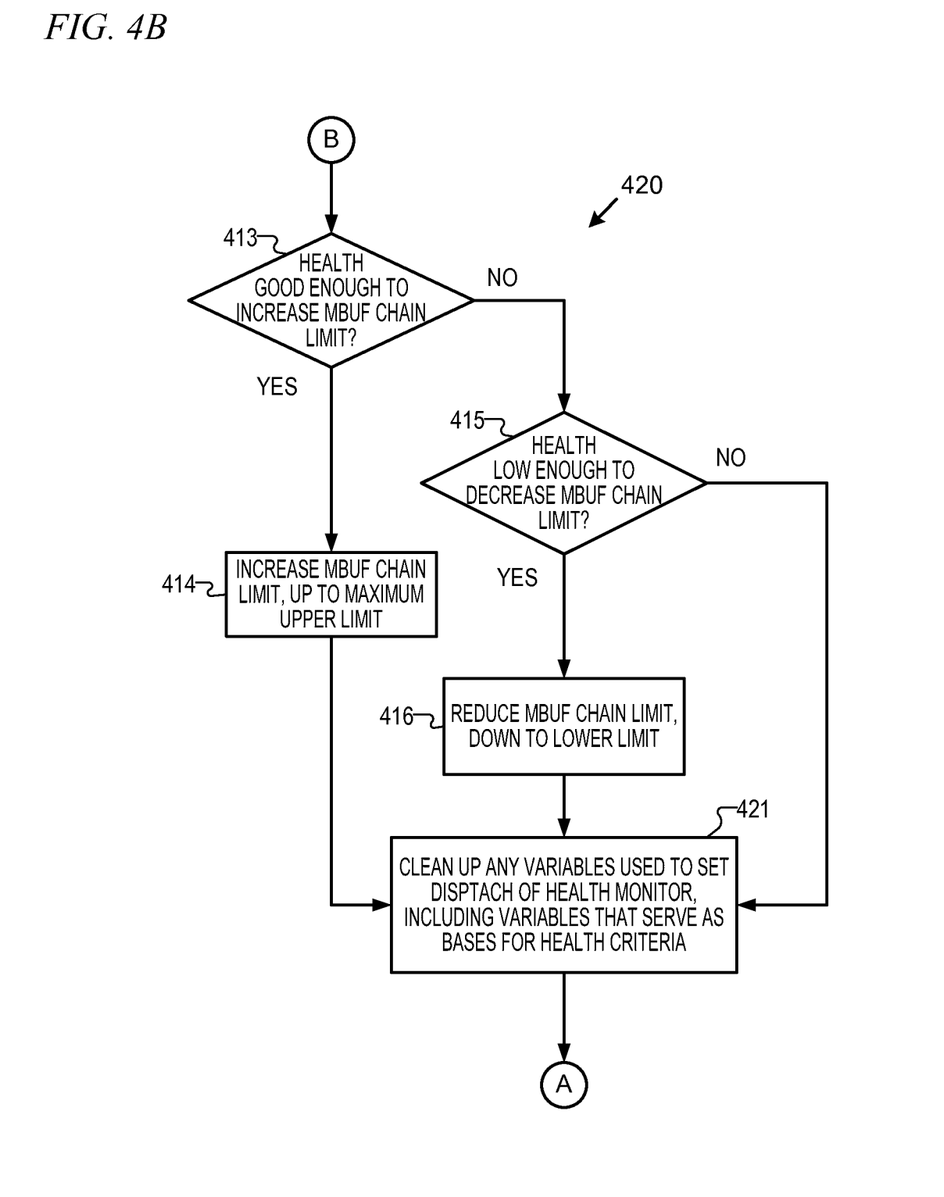
FIG. 4B is a flowchart of further activity performed by health monitor in accordance with an illustrative embodiment of the invention.

FIG. 4B is a flowchart of further activity performed by health monitor in accordance with an illustrative embodiment of the invention. A purpose of flowchart 420 is to dynamically adjust the mbuf chain limit in response to changes to a health of the network connection, for example, the status of packets arriving to the network interface from the network. A health monitor may be dispatched or invoked, for example, by a positive determination at step 411 in FIG. 4A. Initially, the health monitor may determine if the health of the network connection is good enough to increase the mbuf chain limit (step 413). The health of the network connection is a measurement of a degree to which packets are being received at the receive stack. Accordingly, many packets received, or many received without retransmits of the packets, are good or better, as indicators of network connection health, as compared with few packets received or, alternatively, many packets received with attendant retransmits of many of such packets. Provided the health of the network connection satisfies a health criterion, or a positive result occurs at step 413, the health monitor may increase the mbuf chain limit, up to a maximum upper limit (step 414). A health criterion is a comparison of the health of the network connection as meeting or surpassing a threshold value, where surpassing the threshold value is, for example, a ratio being below a preset point along a health dimension of a network connection.

Alternatively, the health monitor may determine that the health of the network connection is not good enough at step 413. In response, the health monitor may further determine whether the health of the network is low enough to decrease the mbuf chain limit (step 415). A positive determination at step 415 may cause the health monitor to reduce the mbuf chain limit, at least to an extent permissible by a lower limit (step 416). A negative determination at step 415 may cause the health monitor to complete, or otherwise clean up any variables used to set or trigger dispatch of the health monitor (step 421). Such variables can be, for example, those that serve as bases for health criteria used in steps 413 and 415. Similarly, after steps 414 and 416, the health monitor may perform step 421 and then return processing to the data processing system to perform step 403 in FIG. 4A.

Another illustrative embodiment of the invention may make the determination to dispatch the health monitor based on a pseudo-random number of traversals through step 411. In other words, a traversal counter may be set to be a randomized integer within a suitable range, for example at step 401 and/or step 421's clean up. Accordingly, at step 411, an evaluation of the randomized integer (or counter) may be made to determine if it is larger than zero. Each iteration through step 411 may be marked by decrementing the integer, until the integer is zero, at which point, the health monitor dispatch is determined to be necessary at step 411.

A still further illustrative embodiment of the invention may be dispatch the health monitor based on an elapsed period of time or interval, which may be marked from a count-down timer initially set, or reset at step 401 and/or step 421. Accordingly, contemporaneously with the interval running out, step 411 may be determined to be positive, or requiring a health monitor dispatch. A suitable time-out value that may be used to measure the interval may be one second. Any determination that the one second interval has not run (since the time of step 411 initialization or time of a previous health monitor entry), will be that the health monitor dispatch is unnecessary.

Accordingly, per this further illustrative embodiment, processing may continue after such negative determination at step 403.

A still further illustrative embodiment of the invention may trigger dispatch the health monitor. The dispatch could be based on resetting the elapsed period of time or interval to be a pseudo-random time between suitable minimum and maximum time intervals, for example, a tenth of a second and 20 seconds. Such a randomized resetting of the time-out value may be pseudo-randomly selected at steps 401 and/or 421.

At least two embodiments of the invention can be implemented based on varying the meaning and scope of the health criteria used at steps 413 and 415.

A first illustrative embodiment of the invention may rely on a health criterion measured based on data collected between dispatches of the health monitor. In other words, three sub-steps may occur in relation to step 408 (mbuf chain reached mbuf chain limit). First, the number of times the maximum mbuf chain limit is met (positive outcome) count is determined to form a first number. In other words, the first number is a number of mbuf data structures that are filled during the interval between dispatches. Second, the number of times the maximum mbuf chain limit is not met (negative outcome) is determined to form a second number. Third, the ratio of the met versus not met numbers is determined to form a health measure. In other words, the health measure is first number over second number, and can be based, in part, on a number of returned mbuf data structures are filled. Accordingly, a health criterion can be "if the health measure exceeds a predetermined value". In other words, if the health measure exceeds the predetermined value at step 413 in the health monitor dispatch 420, then the positive branch at step 413 is taken. The predetermined value can be a threshold number of returned mbuf data structures.

Conversely, a failure to exceed the predetermined value can cause the negative branch to be taken to reach step 415. At step 415, the health monitor may compare the health measure to a second health criterion. The second health criterion can be "if the health measure is less than another predetermined value". Accordingly, if the health measure is low enough at step 415, the health monitor may take the positive branch at step 415.

A second further illustrative embodiment of the invention may rely on a health criterion measured based on detecting TCP session timeouts. A high number of TCP session timeouts can be an indicator of diminished health of the network connection. TCP session timeouts can be inferred if two packets bearing the same serial number are received within a poor health interval. Alternatively, the network stack may notify the device driver that a timeout condition has occurred for the network interface controlled by the device driver. The health criterion may be revised according to one or more such notices from a network stack. Accordingly, the data processing system may record a count of packets of the same serial number that occur in the poor health interval as a sub-step to step 403, receiving packets.

In the second further illustrative embodiment, the health criterion used at step 413 can be "if sufficiently few TCP session timeouts have occurred since previous health monitor invocation". Accordingly, the health criterion is determined to be positive if the TCP session timeouts are less than a threshold value.

In contrast, the health criterion used at step 415 can be "if TCP session timeouts have exceeded a second threshold value since a previous health monitor invocation". Accordingly, the second health criterion is determined to be positive at step 415 in response to the TCP session timeouts being below the second threshold value.

Third and still further embodiments of the invention may rely on a health criterion that is determined in response to receiving a predetermined number of receive buffer descriptors.

An outcome to the above-described approaches can be that the kernel or application layer can traverse an mbuf data structure at a lower rate per plurality of packets received as compared to traversing the mbuf chain limited by a first mbuf chain limit established at step 401. Such a reduction in frequency of traversals of the mbuf data structure can be responsive to increasing the mbuf chain limit to the second, higher, mbuf chain limit.

One or more embodiments may permit adjusting an mbuf chain limit among allowable levels for the mbuf chain limit in response to varying conditions of a network connection. Steps 413, 414, 416, and 417 can cooperate as a way to routinely increase or decrease mbuf chain limits. Accordingly, in an environment that may be throttled upstream by 10 megabit per second networks, 100 megabit per second networks, and 1 gigabit per second networks, the illustrative embodiments may adjust to rates and efficiencies particularly suiting each type of packet flow.

It is can be appreciated that although a majority of packets arriving to a network interface from the network may be internet protocol packets, that the network connection can be a superset of packets that includes, in addition to internet protocol packets, other Ethernet packets.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system, apparatus, or device.

The medium can be an electronic, magnetic, optical, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for setting mbuf chain limits in a device driver, the method comprising:
    a computer initializing a maximum upper limit for a mbuf chain limit to a pre-set level;
    the computer receiving at least one packet;
    the computer returning an mbuf data structure in response to receiving at least one packet;
    measuring a health of a network connection to determine whether the network connection satisfies a first health criterion;
    responsive to the health of the network connection not satisfying the first health criterion, the computer reducing the mbuf chain limit to a second mbuf chain limit;
    the computer measuring the health of the network connection to determine whether the network connection meets a second health criterion; and
    responsive to the network connection satisfying the second health criterion, the computer increasing the mbuf chain limit to a second mbuf chain limit, wherein the second mbuf chain limit is a higher than the pre-set level.

2. The computer implemented method of claim 1, wherein the first health criterion is that among a predetermined number of received mbuf data structures, a threshold number of returned mbuf data structures are filled.

3. The computer implemented method of claim 2, wherein the second health criterion is determined in response to receiving a number of packets.

4. The computer implemented method of claim 1, wherein the second health criterion is measured in response to receiving a predetermined number of receive buffer descriptors.

5. The computer implemented method of claim 1, further comprising:
    measuring the health of the network connection to determine whether the network connection meets a third health criterion in response to receiving a second number of receive buffer descriptors after receiving a predetermined number of receive buffer descriptors; and
    responsive to the network connection meeting the third health criterion, increasing the mbuf chain limit a second time to a mbuf chain limit greater than the second mbuf chain limit.

6. The computer implemented method of claim 5, wherein the second number of receive buffer descriptors is determined using a pseudo-random algorithm to select a number in a range of allowable values.

7. The computer implemented method of claim 1, wherein the second health criterion is a determination that packet retransmits is below a packet retransmit level of retransmits per comparison level of packets received.

8. A computer program product for setting mbuf chain limits in a device driver, the computer program product comprising: a computer readable storage medium device having computer readable program code embodied therewith, the computer readable program code comprising:
    computer readable program code configured to initialize a maximum upper limit for a mbuf chain limit to a pre-set level;
    computer readable program code configured to receive at least one packet;
    computer readable program code configured to return an mbuf data structure in response to receiving at least one packet;
    computer readable program code configured to measure a health of a network connection to determine whether the network connection satisfies a first health criterion;
    computer readable program code configured to reduce the mbuf chain limit to a second mbuf chain limit, responsive to the health of the network connection not satisfying the first health criterion;
    computer readable program code configured to measure the health of the network connection to determine whether the network connection meets a second health criterion; and
    computer readable program code configured to increase the mbuf chain limit to a second mbuf chain limit, wherein the second mbuf chain limit is higher than the pre-set level responsive to the network connection satisfying the second health criterion.

9. The computer program product of claim 8, wherein the first health criterion is that among a predetermined number of received mbuf data structures, a threshold number of returned mbuf data structures are filled.

10. The computer program product of claim 9, wherein the second health criterion is determined in response to receiving a number of packets.

11. The computer program product of claim 8, wherein the second health criterion is measured in response to receiving a predetermined number of receive buffer descriptors.

12. The computer program product of claim 8, further comprising:
    computer readable program code configured to measure the health of the network connection to determine whether the network connection meets a third health criterion in response to receiving a second number of receive buffer descriptors after receiving a predetermined number of receive buffer descriptors; and computer readable program code configured to increase the mbuf chain limit a second time to a mbuf chain limit greater than the second mbuf chain limit, responsive to the network connection meeting the third health criterion.

13. The computer program product of claim 12, wherein the second number of receive buffer descriptors is determined using a pseudo-random algorithm to select a number in a range of allowable values.

14. The computer program product of claim 8, further comprising:
   computer readable program code configured to traverse the mbuf data structure at a lower rate per plurality of packets received as compared to traversing the mbuf chain limit using first mbuf chain limit responsive to computer readable program code configured to increase the mbuf chain limit to the second mbuf chain limit, wherein the second health criterion is a determination that packet retransmits is below a packet retransmit level of retransmits per comparison level of packets received.

15. A data processing system comprising:
   a bus;
   a storage device connected to the bus, wherein computer usable code is located in the storage device;
   a communication unit connected to the bus;
   a processing unit connected to the bus, wherein the processing unit executes the computer usable code for setting mbuf chain limits in a device driver, wherein the processing unit executes the computer usable program code to initialize a maximum upper limit for a mbuf chain limit to a pre-set level; receive at least one packet; return an mbuf data structure in response to receiving at least one packet; measure a health of the network connection to determine whether the network connection satisfies a first health criterion; reduce the mbuf chain limit to a second mbuf chain limit, responsive to the health of the network connection not satisfying the first health criterion; measure the health of the network connection to determine whether the network connection meets a second health criterion; and increase the mbuf chain limit to a second mbuf chain limit, wherein the second mbuf chain limit is higher than the pre-set level, responsive to the network connection satisfying the second health criterion.

16. The data processing system claim 15, wherein the first health criterion is that among a predetermined number of received mbuf data structures, a threshold number of returned mbuf data structures are filled.

17. The data processing system claim 16, wherein the second health criterion is determined in response to receiving a number of packets.

18. The data processing system claim 15, wherein the second health criterion is measured in response to receiving a predetermined number of receive buffer descriptors.

19. The data processing system claim 15, wherein the processing unit further executes computer usable code to measure the health of the network connection to determine whether the network connection meets a third health criterion in response to receiving a second number of receive buffer descriptors after receiving a predetermined number of receive buffer descriptors; and increase the mbuf chain limit a second time to a mbuf chain limit greater than the second mbuf chain limit, responsive to the network connection meeting the third second health criterion.

20. The data processing system claim 19, wherein the second number of receive buffer descriptors is determined using a pseudo-random algorithm to select a number in a range of allowable values.

* * * * *